United States Patent
Clark

[11] 3,944,888
[45] Mar. 16, 1976

[54] SELECTIVE TRIPPING OF TWO-POLE GROUND FAULT INTERRUPTER

[75] Inventor: William R. Clark, Bedford, Mass.

[73] Assignee: I-T-E Imperial Corporation, Spring House, Pa.

[22] Filed: Oct. 4, 1974

[21] Appl. No.: 512,106

[52] U.S. Cl. ........... 317/18 D; 317/27 R; 317/33 SC
[51] Int. Cl.² .................................................. H02H 3/28
[58] Field of Search .. 317/18 R, 18 D, 27 R, 33 SC, 317/155.5, 137

[56] References Cited
UNITED STATES PATENTS

| | | |
|---|---|---|
| 3,252,052 | 5/1966 | Nash ................................. 317/18 D |
| 3,258,646 | 6/1966 | Fowler ......................... 317/155.5 X |
| 3,895,263 | 7/1975 | Clark ................................ 317/18 D |

*Primary Examiner*—J. D. Miller
*Assistant Examiner*—Patrick R. Salce
*Attorney, Agent, or Firm*—Ostrolenk, Faber, Gerb & Soffen

[57] ABSTRACT

A ground fault detector-interrupter for a single phase three wire electrical system includes a polarity sensitive fault detector controlling a gate in a manner such that only the hot line that has a ground fault will be interrupted.

10 Claims, 1 Drawing Figure

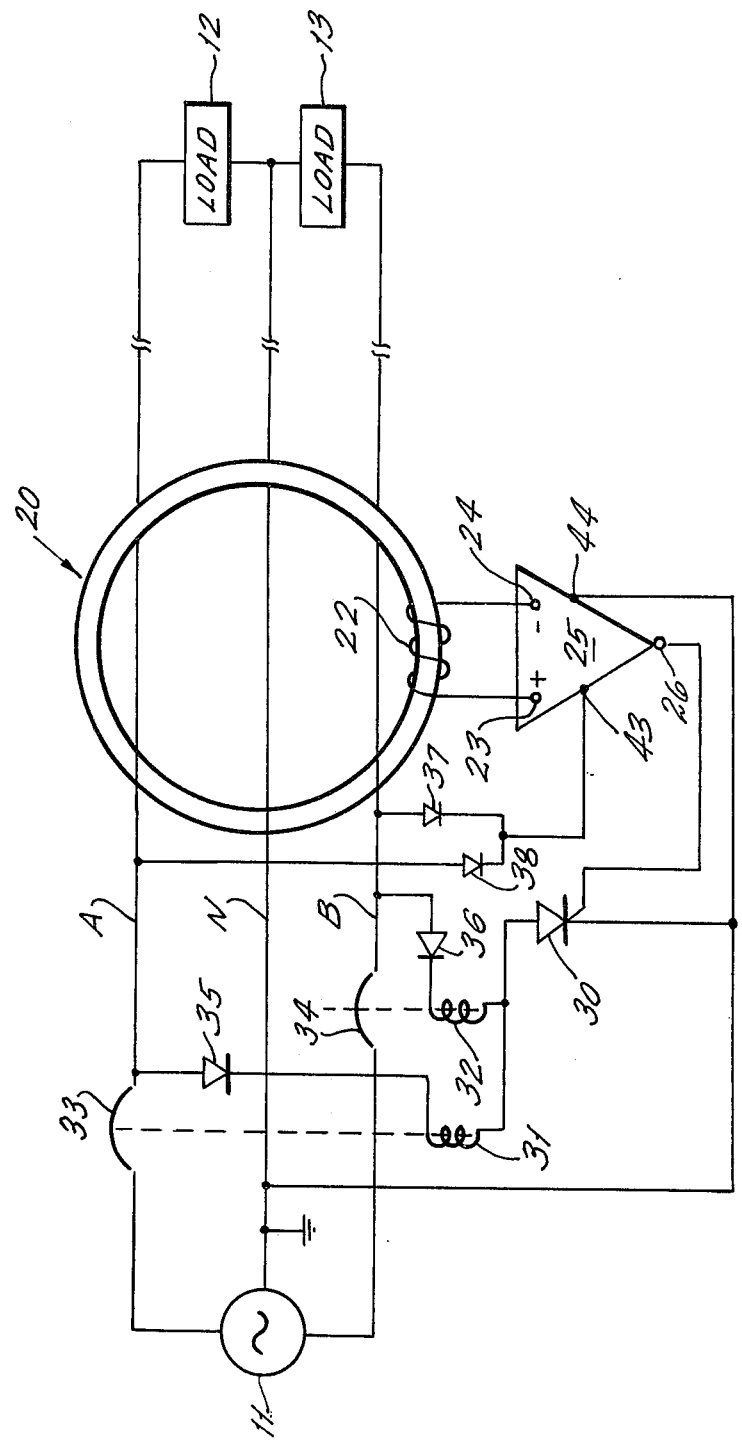

SELECTIVE TRIPPING OF TWO-POLE GROUND FAULT INTERRUPTER

In a single phase three wire electrical system, when one of the hot lines becomes deenergized because of fault conditions or otherwise, it is often desirable to have the other hot line remain energized. This is particularly so when one hot line controls a lighting circuit and the other hot line provides an auxiliary power circuit. However, when a conventional ground fault detector-interrupter is used, a ground fault in either circuit will cause opening of both circuits so that if the ground fault is in the axiliary power circuit loss of lighting power will make corrective action more difficult.

The instant invention overcomes the foregoing difficulty by providing selective means to deenergize only the circuit having the ground fault. This is accomplished by utilizing a detector-discriminator which produces a control signal for closing an electronic switch only when the ground fault is of a particular polarity. The switch is in circuit with both of the separate operating coils for opening switches in the respective hot lines. Diodes connected to each of the hot lines are in series with the respective operating coils and are so connected that an operating coil will be energized only if the switch or gate is conducting at a time when the hot line connected to the coil in question is of the same polarity as the ground fault.

Accordingly, a primary object of the instant invention is to provide a ground fault detector-interrupter that will open only the hot line in the faulted circuit or circuits of a single phase three wire electrical system.

This object, together with other objects of this invention, will become apparent after reading the following description of the accompanying drawing in which the single FIGURE is a schematic of a ground fault detector-interrupter constructed in accordance with teachings of the instant invention to interrupt only the circuit or circuits of a single phase, three wire system in which ground faults are present.

Now referring to the FIGURE. Single phase source 11 is connected by hot conductors A, B and neutral conductor N to energize electrical loads 12, 13. Neutral N is grounded at its source end. Conductors A, B, N extend through toroidal magnetic core 21 of balanced transformer 20 to constitute three separate single turn primary windings. Transformer 20 also includes multi-turn secondary 22 connected to input terminals 23, 24 of amplifier-control 25. Output terminal 26 of amplifier 25 is connected to the switching input of controllably conductive semi-conductor switch or gate 30.

The power circuit of switch 30 is connected between neutral conductor N and the junction between operating coils 31, 32. The latter, when energized, bring about opening of the respective switches 33, 34 in series with the respective hot lines A, B. Semi-conductor diodes 35, 36 connect coils 31, 32 to the respective hot conductors A, B.

Diodes 37 and 38 provide power from hot conductors B and A, respectively, for amplifier 25 at positive energizing terminal 43 thereof. Negative energizing terminal 44 of amplifier 25 is connected to neutral N. The construction of amplifier 25 is such that there will be an output at terminal 26 only when terminal 43 is energized, and input terminal 23 is positive with respect to input terminal 24. Thus, amplifier 25 acts as a polarity sensitive device.

When there is a ground fault on line A, the fault current will flow through transformer 20 toward the load 12, while line A is positive with respect to the neutral line. This will produce an output voltage on winding 22 of a polarity such that amplifier input terminals 23, 24 are positive and negative, respectively. Amplifier output 26 will go positive, triggering switch 30 which will energize coil 31 through diode 35. At this time diode 36 is blocking to prevent coil 32 from being energized.

If a ground fault occurs on line A while line A is in the negative half cycle, fault current will flow toward the source 11 and the output voltage at terminal 26 will try to go negative and gate 30 will remain in a blocking state. During the following positive half cycle, fault current will flow toward the load 12 and interrupter 33 will open in accordance with the prior description.

For ground faults on line B, the foregoing procedure is repeated except that the opening of interrupter 34 occurs when line B is positive, which is also when fault current is flowing toward load 13.

Although there have been described preferred embodiments of this novel invention, many variations and modifications will now be apparent to those skilled in the art. Therefore, this invention is to be limited not by the specific disclosure herein, but only by the appending claims.

The embodiments of the invention in which an exclulsive privilege or property is claimed are defined as follows:

1. A ground fault detector-interrupter for a single phase three wire electrical system having a neutral conductor and first and second hot conductors at potentials of opposite polarities with respect to the neutral conductor; said detector-interrupter including first and second switch means in series with the respective first and second hot conductors, first and second operating means which upon being energized open the respective first and second switch means, detector means for monitoring current conditions at said neautral and hot conductors, and producing an output related to unbalanced currents in said neutral and hot conductors, control means which receives said output and produces a control signal related to the polarity of said output, switching means operated by said control signal and constructed to be closed when said output is of a predetermined polarity, first and second energizing circuits for the respective first and second operating means, said first energizing circuit connected between said neutral and said first hot conductors and including in electrical series a first semi-conductor means, said first operating means and said switching means, said second energizing circuit connected between said neutral and said second hot conductors and including in electrical series a second semi-conductor means, said second operating means and said switching means; each of said semi-conductors being connected in circuit to conduct and thereby permit energization of the operating means in circuit therewith when the hot conductor connected thereto is of said predetermined polarity and said switching means is closed.

2. A ground fault detector-interrupter as set forth in claim 1 in which the control means includes a polarity sensitive amplifier.

3. A ground fault detector-interrupter as set forth in claim 1 in which the predetermined polarity is positive with respect to the neutral conductor.

4. A ground fault detector-interrupter as set forth in claim 1 in which the detector means includes a balanced transformer including first, second and third primaries connected in series with the respective first hot, second hot and neutral conductors, and a secondary winding wherein said output is induced.

5. A ground fault detector-interrupter as set forth in claim 1 in which each of the switch means comprises a semi-conductor diode.

6. A ground fault detector-interrupter as set forth in claim 5 in which the switching means comprises a controllably conductive semi-conductor device.

7. A ground fault detector-interrupter as set forth in claim 6 in which the detector means includes a balanced transformer including first, second, and third primaries connected in series with the respective first hot, second hot and neutral conductors, and a secondary winding wherein said output is induced.

8. A ground fault detector-interrupter as set forth in claim 7 in which the predetermined polarity is positive with respect to the neutral conductor.

9. A ground fault detector-interrupter as set forth in claim 7 in which the control means includes a polarity sensitive amplifier.

10. A ground fault detector-interrupter as set forth in claim 9 in which the predetermined polarity is positive with respect to the neutral conductor.

* * * * *